(12) United States Patent
Tan et al.

(10) Patent No.: US 10,007,065 B2
(45) Date of Patent: Jun. 26, 2018

(54) MULTIPLEXED OPTOELECTRONIC ENGINES

(71) Applicant: Hewlett Packard Enterprise Development LP, Houston, TX (US)

(72) Inventors: Michael Renne Ty Tan, Palo Alto, CA (US); Sagi Varghese Mathai, Palo Alto, CA (US); Georgios Panotopoulos, Palo Alto, CA (US); Paul Kessler Rosenberg, Palo Alto, CA (US); Wayne Victor Sorin, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 15/030,427

(22) PCT Filed: Oct. 31, 2013

(86) PCT No.: PCT/US2013/067880
§ 371 (c)(1),
(2) Date: Apr. 19, 2016

(87) PCT Pub. No.: WO2015/065459
PCT Pub. Date: May 7, 2015

(65) Prior Publication Data
US 2016/0246008 A1    Aug. 25, 2016

(51) Int. Cl.
*H04B 10/25* (2013.01)
*G02B 6/293* (2006.01)
(Continued)

(52) U.S. Cl.
CPC ....... *G02B 6/29365* (2013.01); *G02B 6/2938* (2013.01); *G02B 6/29367* (2013.01);
(Continued)

(58) Field of Classification Search
CPC .............................. H04J 14/02; H04B 10/2504
See application file for complete search history.

(56) References Cited

U.S. PATENT DOCUMENTS

| 6,198,864 B1 | 3/2001 | Lemoff et al. |
| 6,419,404 B1 | 7/2002 | Deri et al. |
| (Continued) | | |

FOREIGN PATENT DOCUMENTS

| EP | 1473579 A1 | 11/2004 |
| KR | 20130037568 A | 4/2013 |

OTHER PUBLICATIONS

International Search Report & Written Opinion received in PCT Application No. PCT/US2013/067880, dated Jul. 17, 2014, 11 pages.

(Continued)

*Primary Examiner* — Dzung Tran
(74) *Attorney, Agent, or Firm* — Dhand Law PC (57) ABSTRACT

An example device includes a first semiconductor component comprising at least two lasers to emit light at a first wavelength; a second semiconductor component comprising at least two lasers to emit light at a second wavelength, the first wavelength being different from the second wavelength; and an optical multiplexer to receive light from two lasers at the first wavelength and light from two lasers at the second wavelength. The optical multiplexer component includes a first output interface to couple light from one laser at the first wavelength and light from one laser at the second wavelength to a first optical fiber, and a second output interface to couple light from one laser at the first wavelength and light from one laser at the second wavelength beams to a second optical fiber.

10 Claims, 4 Drawing Sheets

(51) Int. Cl.
  *H04J 14/02* (2006.01)
  *G02B 6/42* (2006.01)

(52) U.S. Cl.
  CPC ....... *G02B 6/4215* (2013.01); *H04B 10/2504* (2013.01); *H04J 14/02* (2013.01)

(56) References Cited

U.S. PATENT DOCUMENTS

| | | | |
|---|---|---|---|
| 6,563,976 B1* | 5/2003 | Grann | G02B 6/29311 385/24 |
| 6,870,976 B2 | 3/2005 | Chen et al. | |
| 6,937,786 B2 | 8/2005 | Lemoff | |
| 2003/0058520 A1 | 3/2003 | Yu et al. | |
| 2004/0165828 A1 | 8/2004 | Capewell et al. | |
| 2004/0218875 A1* | 11/2004 | Lemoff | G02B 6/4206 385/89 |
| 2005/0111773 A1 | 5/2005 | Verdiell | |
| 2005/0152640 A1* | 7/2005 | Lemoff | G02B 6/125 385/24 |
| 2011/0292953 A1* | 12/2011 | Liu | H01S 5/06256 372/20 |
| 2012/0189306 A1 | 7/2012 | Du et al. | |
| 2012/0230695 A1* | 9/2012 | O'Krafka | G02B 6/43 398/87 |
| 2016/0195677 A1* | 7/2016 | Panotopoulos | G02B 6/4214 250/227.23 |

OTHER PUBLICATIONS

Lemoff, B.E. et al., "MAUI: Enabling Fiber-to-the-processor with Parallel Multiwavelength Optical Interconnects," (Research Paper), Journal of Lightwave Technology 22.9, Sep. 2004, pp. 2043-2054, available at http://citeseerx.ist.psu.edu.viewdoc/download?doi=10.1.1.159.5996&rep=rep1&type=pdf.
Partial European Search Report dated Jun. 6, 2017 for EP Application No. 13896285.7; pp. 13.

* cited by examiner

MULTIPLEXED OPTOELECTRONIC ENGINES

BACKGROUND

Wave division multiplexing (WDM) is a method of communication that may be used to communicate multiple channels over a single fiber optic cable where each signal is transmitted with a distinct wavelength beam. WDM systems may utilize multiple fibers in order to increase the capacity.

BRIEF DESCRIPTION OF THE DRAWINGS

For a more complete understanding of various examples, reference is now made to the following description taken in connection with the accompanying drawings in which:

FIG. 2 illustrates a first example de-multiplexer (DE-MUX) device;

DETAILED DESCRIPTION

Wavelength division multiplexing (WDM) is an approach to scale bandwidth density in datacenters without the need to increase fiber count over multiple generations. Example systems and methods described herein may provide a two dimensional (2D) WDM optoelectronic (OE) engine. The OE engine may be composed of the following components: 1) 2D vertical cavity surface emitting laser (VCSEL) and/or surface illuminated photodetector (SI-PD) arrays, 2) zig-zag optical multiplexer and/or de-multiplexer (MUX/DEMUX) components, 3) 2D output/input coupling interfaces, and 4) 2D fiber (e.g., ferules/cables) arrays. The example systems may take advantage of the 2D wafer scale fabrication of VCSELs and SI-PDs to construct 2D WDM Tx (transmit) and Rx (receive) OE engines.

The example systems and methods described herein may provide a path to efficiently use embedded fiber infrastructure in datacenters by increasing the bandwidth density and gracefully scaling bandwidth demands from generation to generation without having to increase fiber count.

Figure 1:
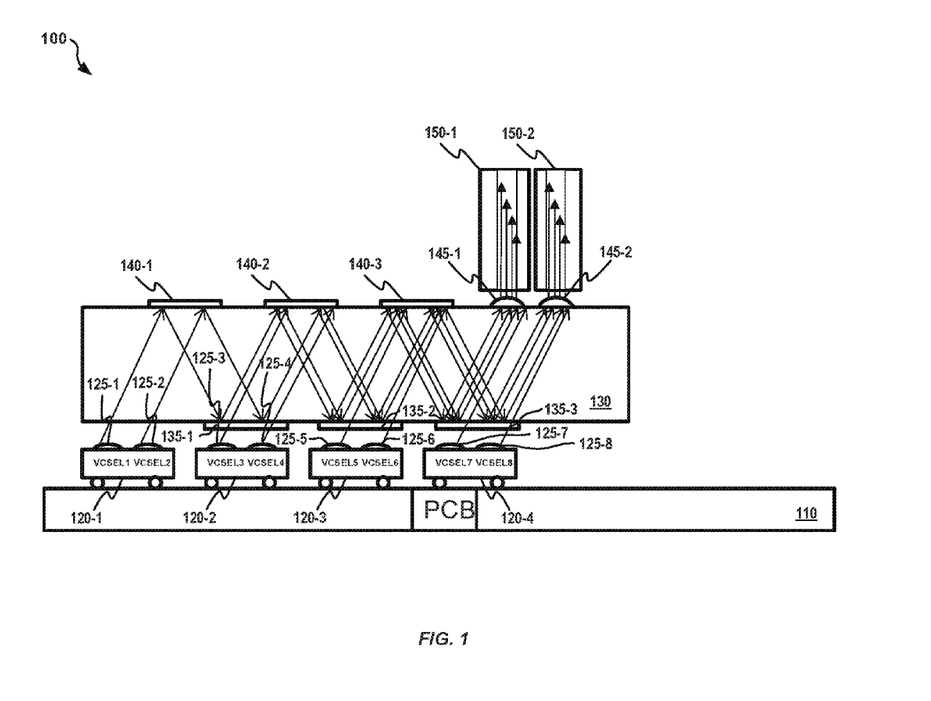
FIG. 1 illustrates an example multiplexer (MUX) device.

FIG. 1 illustrates an example multiplexer (MUX) device 100 formed on a substrate (e.g., a printed circuit board or PCB) 110 and including a plurality of semiconductor laser components (e.g., VCSELs) 120, and an optical MUX component (e.g., a zig-zag MUX component) 130 coupled to two optical fibers 150-1 and 150-2. In this example, the MUX device 100 includes four semiconductor laser components 120-1, 120-2, 120-3 and 120-4, hut other numbers of semiconductor laser components 120 may be used, depending, for example, on the size of the MIA device 100. The substrate 110 is a PCB in this example, but other substrates may be used.

The semiconductor laser components 120 may be mounted in a flip-chip fashion on the substrate 110 as illustrated in FIG. 1. In this example MUX device 100, each of the semiconductor laser components 120 includes two lasers (e.g., VCSELs) 125. The semiconductor laser components 120 may be configured to emit different wavelength laser beams to provide for the WDM capabilities. For example, the semiconductor laser component 120-1 includes a first laser 125-1 and a second laser 125-2 that each may emit a laser beam of a first wavelength, the semiconductor laser component 120-2 includes a third laser 125-3 and a fourth laser 125-4 that each may emit a laser beam of a second wavelength, the semiconductor laser component 120-3 includes a fifth laser 125-5 and a sixth laser 125-6 that each may emit a laser beam of a third wavelength, and the semiconductor laser component 120-4 includes a seventh laser 125-7 and an eighth laser 125-8 that each may emit a laser beam of a fourth wavelength. The first, second, third and fourth wavelengths are each a different wavelength.

The optical MUX component 130 receives the multiple laser beams from the semiconductor laser components 120 and couples these laser beams to the two fibers 150-1 and 150-2 via two output interfaces 145-1 and 145-2. The output interfaces 145 may be an anti-reflection coated surface, collimator lenses, high contrast grating lens, prisms, or other form of coupling micro-optics.

The optical MUX component 130 includes three reflectors (e.g., relay mirrors) 140-1, 140-2 and 140-3 and three wavelength selective filters 135-1, 135-2 and 135-3. As an alternative to three separate reflectors 140-1, 140-2 and 140-3, a single reflector 140 could be used in some examples. Each of the wavelength selective filters 135 may be configured to allow a certain wavelength, or range of wavelengths, of light to pass through substantially unaffected while reflecting other wavelengths. For example, the first wavelength selective filter 135-1 may allow the laser beams of the second wavelength emitted from the lasers 125-3 and 125-4 to pass while reflecting the laser beams of the first wavelength that are emitted from the lasers 125-1 and 125-2. Similarly, the second wavelength selective filter 135-2 may allow the laser beams of the third wavelength emitted from the lasers 125-5 and 125-6 to pass while reflecting the laser beams of the first and second wavelengths and the third wavelength selective filter 135-3 may allow laser beams of the fourth wavelength emitted from the lasers 125-7 and 125-8 to pass while reflecting the laser beams of the first, second and third wavelengths. In this way, the optical MUX component 130 is able to couple all eight laser beams onto the output interfaces 145-1 and 145-2, which may than couple the laser beams to the first and second fibers 150-1 and 150-2.

The reflectors 140, the wavelength selective filters 135 and the lasers 125 are positioned relative to each other such that a first one of the laser beams of each wavelength, the first, second, third and fourth wavelengths in this example, are directed to the first output interface 145-1, while a second one of the laser beams of each wavelength are directed to the second output interface 145-2. The output interfaces 145-1 and 145-2 couple the combined or collimated sets of first and second ones of the laser beams to the first and second fibers 150-1 and 150-2, respectively.

The example MUX device 100 uses VCSELs that emit lasers vertically away from the substrate 110 and the optical MUX component 130 is positioned above the semiconductor laser components 120. In other example MUX devices, other orientations of optical MUX component and semiconductor laser components may be used. In other examples, the MUX device 100 uses VCSELs with integrated lenses to collimate and/or tilt the laser emission from the VCSEL.

The example MUX device 100 illustrates a single row of semiconductor laser components 120, single row of mirrors 140, and a single row of output fibers 150. However, multiple rows of semiconductor laser components 120, multiple rows of filters 135, multiple rows of mirrors 140, and multiple rows of output fibers 150 may be provided in two dimensional arrays (e.g., by replicating multiple rows into or out of the page as shown in FIG. 1) in order to increase capacity and provide a compact device to take advantage of two dimensional semiconductor laser arrays and/or two dimensional fiber arrays. In some examples, the multiple fibers may be contained in a ferule or optical connector. In addition, a MUX device may include a first array of semiconductor laser components 120 with a first MUX component 130 on a left portion of the substrate 110, as shown in FIG. 1, as well as a second array of semiconductor laser components 120 and a second MUX component 130 positioned in mirror-fashion on the right side of the substrate 110. In other examples, the first and second MUX components are a single unit, rather than distinct parts.

The example semiconductor laser components 120 are illustrated with two lasers 125. However, semiconductor laser components with three or more lasers per component may also be used. A factor that may limit the number of lasers per semiconductor laser component is the resulting angle of incidence of the lasers on the reflectors 140 and the wavelength selective filters 135. Angle of incidences less than or equal to 15 degrees may be used in most applications, for example in polarization independent applications. If polarization locked VCSELs are employed, the angle of incidence can be larger than 15 degrees. A thicker optical MUX component 130 may allow for greater numbers of lasers per component at the expense of a thicker MUX device 100. The MUX device 100 may be preferably two millimeters thick or less.

Figure 2:
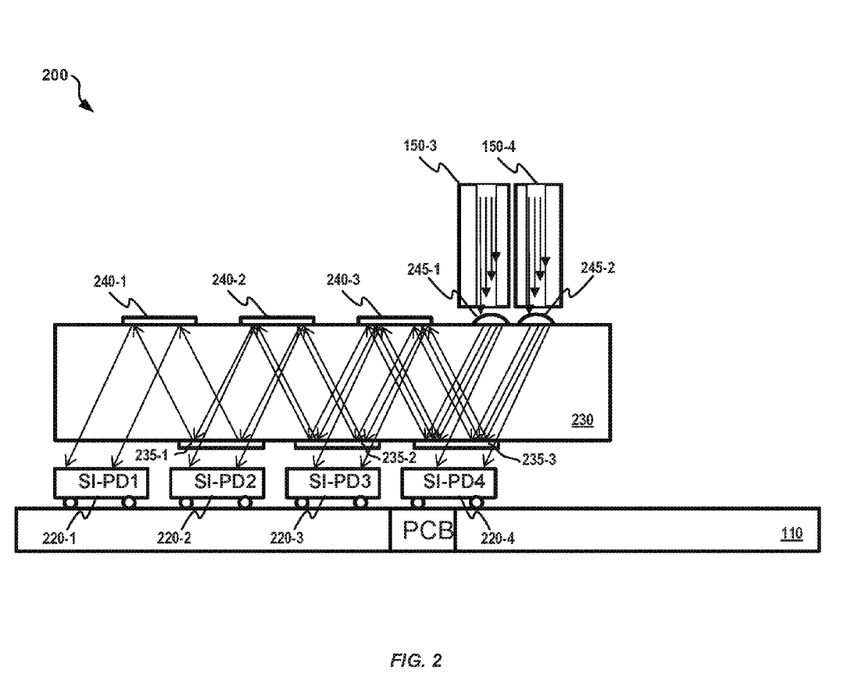

FIG. 2 illustrates a first example de-multiplexer (DE-MUX) device 200 formed on substrate 110 and including a plurality of photodetector devices (e.g., SI-PDs) 220, and an optical DEMUX component (e.g., a zig-zag DEMUX component) 230 coupled to two input fibers 150-3 and 150-4. In this example, the DEMUX device 200 includes four photodetector devices 220-1, 220-2, 220-3 and 220-4, but other numbers of photodetector devices 220 may be used, depending, for example, on the number of unique wavelengths to demultiplex. In some examples, the photodetector devices 220 may be integrated with lenses to focus and/or tilt the incident light for efficient coupling to the photodetector.

In various examples, each photodetector device 220 includes multiple photodetectors. In the example illustrated in FIG. 2, each photodetector device 220 may have two photodetectors. The photodetector devices 220 may be mounted in flip-chip fashion on the substrate 110 as illustrated in FIG. 2. In this example DEMUX device 200, each of the photodetector devices 220 may be configured to detect different wavelength laser beams to provide for WDM receiver capabilities. For example, the photodetector device 220-1 may detect laser beams of a first wavelength, the photodetector device 220-2 may detect laser beams of a second wavelength, the photodetector device 220-3 may detect laser beams of a third wavelength, and the photodetector device 220-4 may detect laser beams of a fourth wavelength. The first, second, third and fourth wavelengths are each a different wavelength. The first, second, third and fourth wavelengths detected by the photodetector devices 220 may be the same or different respective wavelengths of the first, second, third and fourth wavelengths emitted by the semiconductor laser components 120 discussed above in reference to FIG. 1.

The optical DEMUX component 230 receives first and second sets of multiple different wavelength laser beams from a third fiber 150-3 and a fourth fiber 150-4 via a first input interface (e.g., a collimator, coupling lens or prism or high-contrast grating lens) 245-1 and a second input interface 245-2, respectively. The DEMUX component 230 couples these laser beams to the four photodetector devices 220 using three reflectors 240-1, 240-2 and 240-3 (e.g., relay mirrors) in combination with three wavelength selective filters 235-1, 235-2 and 235-3 in a fashion similar to the MUX component 130 in FIG. 1.

As an alternative to three separate reflectors 240-1, 240-2 and 240-3, a single reflector 240 could be used in some examples. Each of the wavelength selective filters 235 may be configured to allow a certain wavelength, or range of wavelengths, of light to pass through substantially unaffected while reflecting other wavelengths. For example, the first wavelength selective filter 235-1 may allow the laser beams of the second wavelength detected by the second photodetector device 220-2 to pass while reflecting the laser beams of the first wavelength that are detected by the first photodetector device 220-1. Similarly, the second wavelength selective filter 235-2 may allow the laser beams of the third wavelength detected by the third photodetector device 220-3 to pass while reflecting the laser beams of the first and second wavelengths and the third wavelength selective filter 235-3 may allow laser beams of the fourth wavelength detected by the fourth photodetector device to pass while reflecting the laser beams of the first, second and third wavelengths. In this way, the optical DEMUX component 230 is able to focus all eight laser beams received from the input interfaces 245-1 and 245-2 onto the proper photodetector devices 220.

The reflectors 240, the wavelength selective filters 235 and the photodetector devices 220 are positioned relative to each other such that first and second ones of the laser beams of each wavelength, the first, second, third and fourth wavelengths in this example, are directed to the each respective photodetector device 220.

The example DEMUX device 200 uses SI-PDs that detect light on an upper surface facing the substrate 110 and the optical DEMUX component 230 is positioned above the photodetector components 220. In other example DEMUX devices, other orientations of optical DEMUX component and photodetector devices may be used.

The example DEMUX device 200 illustrates a single row of photodetector devices 220 and a single row of input fibers 150. However, multiple rows of photodetector devices 220, multiple rows of filters 235, multiple rows of mirrors 240, and multiple rows of input fibers 150 may be provided in two dimensional arrays (e.g., by replicating multiple rows into or out of the page as shown in FIG. 2) in order to increase capacity and provide a compact device to take advantage of two dimensional photodetector arrays and/or two dimensional fiber arrays. In addition, a DEMUX device may include a first array of photodetector devices 220 with a first DEMUX component 230 on a left portion of the substrate 110, as shown in FIG. 2, as well as a second array of photodetector devices 220 and a second DEMUX component 230 positioned in mirror-fashion on the right side of the substrate 110. In other examples, the first and second DEMUX components are a single unit, rather than distinct parts.

Figure 3:
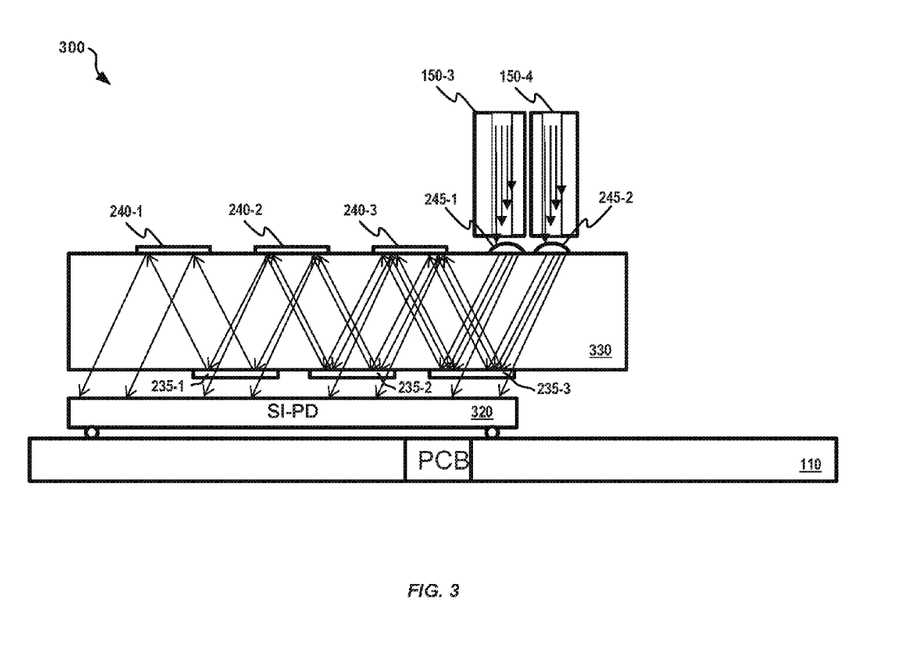
FIG. 3 illustrates a second example DEMUX device.

FIG. 3 illustrates a second example DEMUX device 300 formed on substrate 110 and including a single photodetector device (e.g., SI-PD) 320 in place of the multiple photodetector devices 220 shown in FIG. 2. The single photodetector device 320 may be configured to detect all four wavelengths of light that are received from the input fibers 150-3 and 150-4 via the input interfaces 245-1 and 245-2. In this regard, various examples of the single photodetector device 320 may include multiple photodetectors. The configuration of DEMUX device 300 may be suitable when the range of wavelengths between the first, second, third and fourth wavelengths is small enough to be detected by the single photodetector device 320. In contrast, the DEMUX device 200, which utilizes four photodetector devices 220, may be used for cases where the first, second, third and fourth wavelengths comprise larger ranges of wavelengths. In another example, the MUX device 100 of FIG. 1, the DEMUX device 200 of FIG. 2 or the DEMUX device 300 of FIG. 3 may be positioned on the substrate 110 in a mirror fashion to build a transceiver where the MUX device 100 and DEMUX device 200 may be a single unit.

Figure 4:
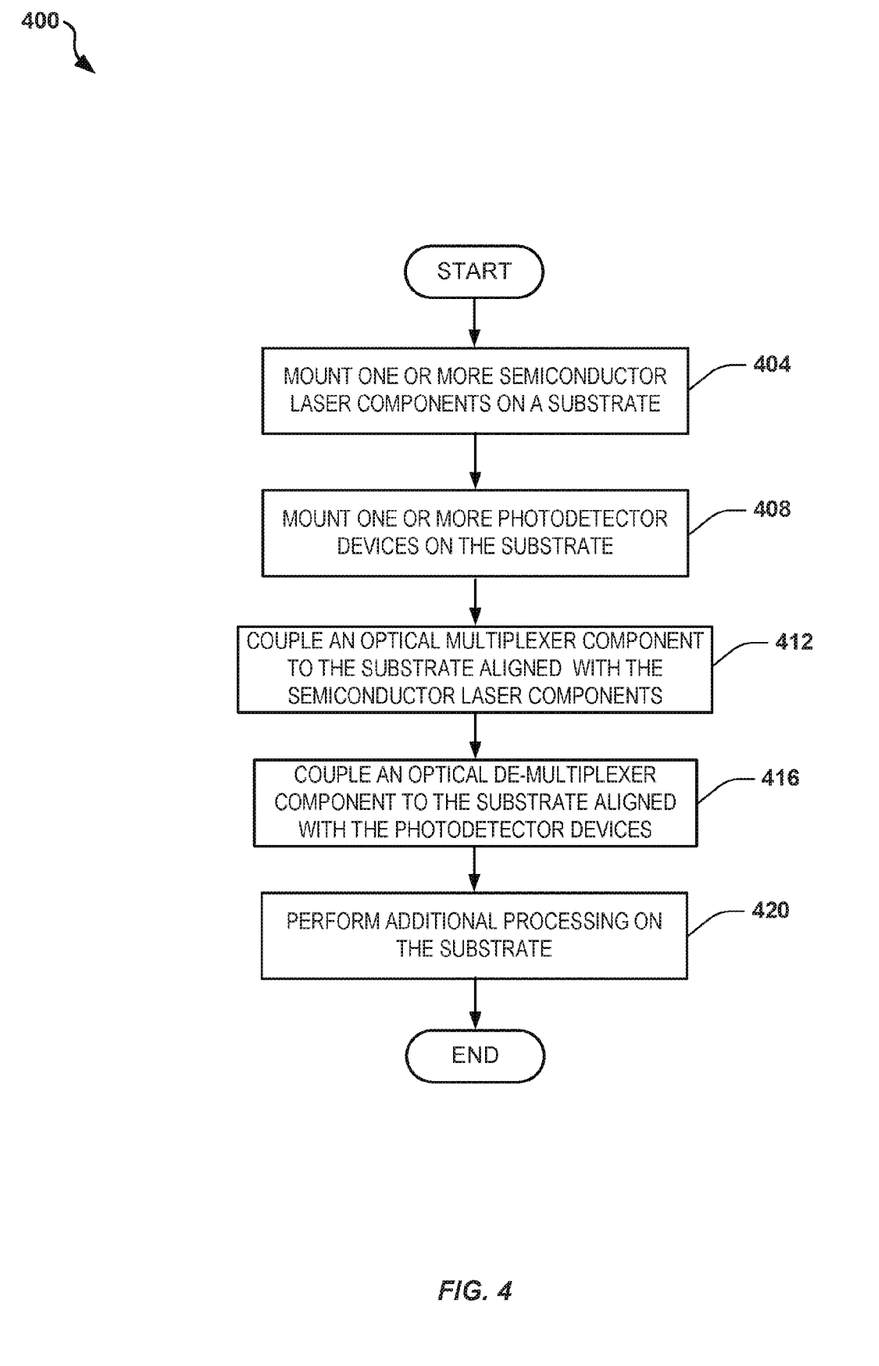
FIG. 4 illustrates an example process for fabricating MUX and DEMUX devices.

FIG. 4 illustrates an example process 400 for fabricating MUX and DEMUX devices. In various examples, the process 400 may be performed to fabricate one or more optical MUX and/or DEMUX devices, such as, for example, the MUX device 100 of FIG. 1, and the DEMUX devices 200 and 300 of FIGS. 2 and 3. The process 400 will now be described in reference to FIGS. 1, 2 and 3.

In the example illustrated in FIG. 4, the process 400 may begin with the mounting of one or more semiconductor laser components on a substrate (block 404). For example, the semiconductor laser components 120 (e.g., VCSELs) may be mounted to the substrate 110. VCSELs may be mounted, in flip-chip fashion, for example, to the substrate 110.

Upon the semiconductor laser components being mounted on the substrate 110, one or more photodetector devices (e.g., the photodetector devices 220 and/or 320) may be mounted to the substrate 110 (408).

At block 412, after the one or more semiconductor laser components are mounted to the substrate at 404, an optical multiplexer component may be coupled to the substrate aligned with the one or more semiconductor laser components. For example, the optical MUX component 130 may be coupled to the substrate in alignment with the four semiconductor laser components 120 such that respective pairs of laser beams of first, second, third and fourth wavelengths, are received from respective ones of the four semiconductor laser components 120. The MUX component may be coupled as a completed component. The various wavelength selective filters 135, the reflectors 140 and walls of the optical MUX component 130 may be formed using, but not limited to, semiconductor, MEMS and thin-film fabrication techniques.

At block 416, after the one or more photodetector devices are mounted to the substrate at 408, an optical de-multiplexer component may be coupled to the substrate aligned with the one or more photodetector devices. For example, the optical DEMUX component 230 may be coupled to the substrate in alignment with the four photodetector devices 220 such that respective pairs of laser beams of first, second, third and fourth wavelengths, are directed to respective ones of the four photodetector devices 220. Alternatively, the optical DEMUX component 230 may be coupled to the substrate in alignment with a single photodetector device 320. The optical DEMUX component may be coupled as a completed component. The various wavelength selective filters 235, the reflectors 240 and walls of the DEMUX device 230 are formed using, but not limited to, semiconductor, MEMS and thin-film fabrication techniques.

At block 420, other additional processing may be performed on the substrate. For example, the semiconductor laser components may be coupled to laser driver integrated circuits, and the photodetector devices may be coupled to transimpedance amplifier integrated circuits. Also, fiber optic cables, ferules, optical connectors, and/or interfaces configured to be coupled to fiber optic cables may be coupled to the substrate in alignment with the and DEMUX devices.

The functions performed at blocks 404-420 may be repeated until all semiconductor devices, optical devices and optical fiber assemblies have been attached to the substrate and/or to other devices such as integrated circuits. The process 400 illustrated in FIG. 4 is an example only and not limiting. In various examples, the process 400 may be altered, for example, by having steps or blocks added, removed, rearranged, combined, and/or performed concurrently.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device comprising:
a first semiconductor component comprising at least two lasers to emit light at a first wavelength;
a second semiconductor component comprising at least two lasers to emit light at a second wavelength, the first wavelength being different from the second wavelength; and
an optical multiplexer to receive light from two lasers at the first wavelength and light from two lasers at the second wavelength, the optical multiplexer component including:
a first output interface to couple light from one laser at the first wavelength and light from one laser at the second wavelength to a first optical fiber,
a second output interface to couple light from one laser at the first wavelength and light from one laser at the second wavelength beams to a second optical fiber,
at least one reflector to reflect substantially all wavelengths of light; and
at least one wavelength selective filter to allow light at either the first wavelength or the second wavelength to pass through and to reflect other wavelengths of light,
wherein, the at least one reflector and the at least one wavelength selective filter are positioned relative to the first and second semiconductor components to direct light from one laser at the first wavelength and light from one laser at the second wavelength to the first output interface and to direct light from one laser at the first wavelength and light from one laser at the second wavelength to the second output interface.

2. The device of claim 1, further comprising:
an optical de-multiplexer having:
a first input interface to receive a first input signal from a first optical fiber, the first input signal including light at a first wavelength and light at a second wavelength;

a second input interface to receive a second input signal from a second optical fiber, the second input signal including light at a first wavelength and light at a second wavelength; and wherein the optical de-multiplexer component directs light at the first wavelength from the first interface and light at the first wavelength from the second interface to a first photodetector and directs light at the second wavelength from the first interface and light at the second wavelength from the second interface to a second photodetector.

3. The device of claim 2, wherein the optical de-multiplexer comprises:

at least one reflector to reflect substantially all wavelengths of light; and at least one wavelength selective filter to allow light at either the first wavelength or the second wavelength to pass through and to reflect other wavelengths of light, wherein, the at least one reflector and the at least one wavelength selective filter are positioned relative to the first and second photodetector devices to direct light from the first input interface at the first wavelength and light from the second input interface at the first wavelength to the first photodetector and to direct light from the first input interface at the second wavelength and light from the second input interface at the second wavelength the second photodetector.

4. The device of claim 1, wherein the optical multiplexer is coupled to a substrate positioned above the first and second semiconductor components.

5. The device of claim 4, wherein at least a portion of the first and second semiconductor components is mounted in flip-chip fashion on the substrate.

6. The device of claim 1, wherein the lasers of the first semiconductor component, the lasers of the second semiconductor component, the reflector, and the at least one wavelength selective filter are arranged in a single row.

7. A method comprising:

mounting a plurality of semiconductor components on a substrate, the plurality of semiconductor components including at least a first semiconductor component comprising at least two first lasers configured to emit first wavelength laser beams and a second semiconductor component comprising at least two second lasers configured to emit second wavelength laser beams, the first wavelength being different than the second wavelength;

coupling, to the substrate in alignment with the at least first and second semiconductor components, an optical multiplexer component configured to receive the two first wavelength beams and the two second wavelength beams, the optical multiplexer component comprising:

a first output interface configured to couple a first one of the first wavelength beams and a first one of the second wavelength beams to a first optical fiber, a second output interface configured to couple a second one of the first wavelength beams and a second one of the second wavelength beams to a second optical fiber; and forming one or more wavelength selective filters and one or more reflector layers above the plurality of semiconductor components, the one or more wavelength selective filters and one or more reflectors being configured to receive the first and second wavelength beams and direct the first ones of the first and second wavelength beams on the first output interface and direct the second ones of the first and second wavelength beams on the second output interface.

8. The method of claim 7, wherein mounting the plurality of semiconductor devices further includes mounting at least a first photodetector device to the substrate, the method further comprising:

coupling, to the substrate in alignment with the at least one photodetector device, an optical de-multiplexer component, the optical de-multiplexer component comprising:

a first input interface configured to receive a first input signal from a third optical fiber, the first input signal including a first beam of a third wavelength and a first beam of a fourth wavelength, and a second input interface configured to receive a second input signal from a fourth optical fiber, the second input signal including a second beam of the third wavelength and a second beam of the fourth wavelength;

wherein the optical de-multiplexer component is configured to direct the first and second beams of the third wavelength and the first and second beams of the fourth wavelength on the first photodetector device.

9. A device, comprising:

a first semiconductor component comprising at least two lasers to emit light at a first wavelength;

a second semiconductor component comprising at least two lasers to emit light at a second wavelength, the first wavelength being different from the second wavelength; and an optical multiplexer to receive light from two lasers at the first wavelength and light from two lasers at the second wavelength, the optical multiplexer component including:

a first output interface to couple light from one laser at the first wavelength and light from one laser at the second wavelength to a first optical fiber, and a second output interface to couple light from one laser at the first wavelength and light from one laser at the second wavelength beams to a second optical fiber; and an optical de-multiplexer having:

a first input interface to receive a first input signal from a first optical fiber, the first input signal including light at a first wavelength and light at a second wavelength;

a second input interface to receive a second input signal from a second optical fiber, the second input signal including light at a first wavelength and light at a second wavelength; and wherein the optical de-multiplexer component directs light at the first wavelength from the first interface and light at the first wavelength from the second interface to a first photodetector and directs light at the second wavelength from the first interface and light at the second wavelength from the second interface to a second photodetector.

10. The device of claim 9, wherein the optical de-multiplexer comprises:

at least one reflector to reflect substantially all wavelengths of light; and at least one wavelength selective filter to allow light at either the first wavelength or the second wavelength to pass through and to reflect other wavelengths of light, wherein, the at least one reflector and the at least one wavelength selective filter are positioned relative to the first and second photodetector devices to direct light from the first input interface at the first wavelength and light from the second input interface at the first wavelength to the first photodetector and to direct light from the first input interface at the second wavelength and light from the second input interface at the second wavelength the second photodetector.

\* \* \* \* \*